Sept. 25, 1945. E. F. SMITH 2,385,546
CONTINUOUS PROCESS FOR THE PREPARATION OF ACETYLENIC ALCOHOLS
Filed Nov. 5, 1943
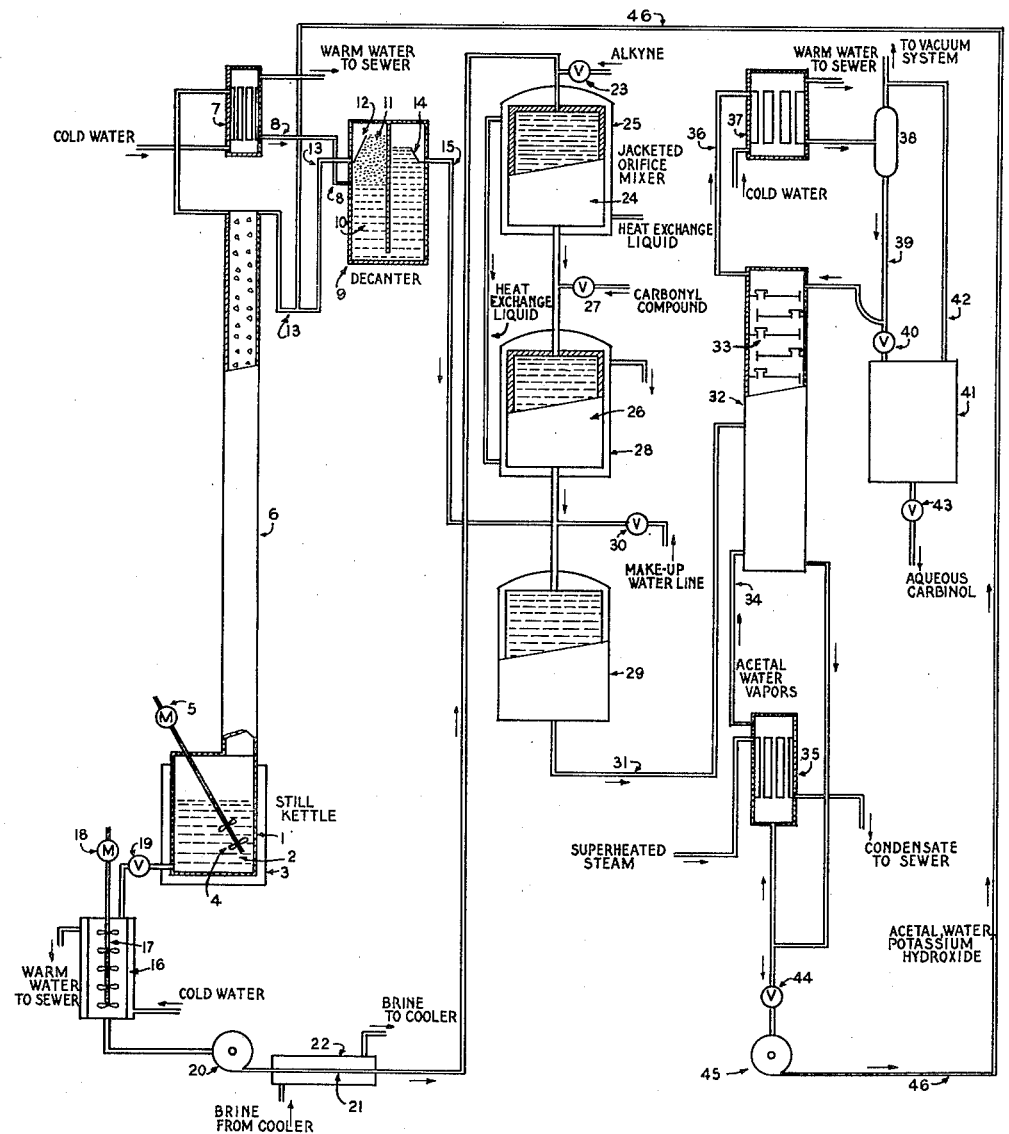
INVENTOR.
Everet F. Smith
BY Francis M. Crawford

UNITED STATES PATENT OFFICE 2,385,546

CONTINUOUS PROCESS FOR THE PREPARATION OF ACETYLENIC ALCOHOLS

Everet F. Smith, Terre Haute, Ind., assignor to Commercial Solvents Corporation, Terre Haute, Ind., a corporation of Maryland Application November 5, 1943, Serial No. 509,062

7 Claims. (Cl. 260—638)

The present invention relates to a process for the preparation of acetylenic alcohols. More particularly, it relates to a continuous process for the production of acetylenic alcohols from carbonyl compounds and 1-alkynes having at least one terminal hydrogen atom.

It has been known for some time that acetylenic alcohols can be synthesized by the reaction of carbonyl compounds, i. e., aldehydes and ketones, with various alkali metal acetylides, or with organo-metallic derivatives of acetylene, or substitution products thereof.

The procedure first mentioned can be practiced in at least two different variations, the first of which involves the use of liquid ammonia as a solvent for the reactants. This method has certain obvious disadvantages, such as the maintenance of low temperatures of the order of $-30°$ to $-40°$ C., and the use of relatively expensive starting materials, such as sodium metal or sodamide, and the separation and recovery of the ammonia. In the second modification of this general method, a suspension of anhydrous, finely-ground potassium hydroxide in polyether compounds, such as dimethoxymethane or ethylene glycol diethyl ether, is used as a menstruum for the absorption of the 1-alkyne and for subsequent reaction with the carbonyl compound. In this process, the potassium hydroxide is pulverized and added to the polyether compound at ordinary temperatures, i. e., between 20 and 35° C. The 1-alkyne and the carbonyl compound are then added, and the resulting condensation product is the potassium derivative of the desired acetylenic alcohol, from which the alcohol itself is liberated by addition of a sufficient quantity of water. In the latter operation, two liquid layers are obtained: an upper layer comprising the acetylenic alcohol dissolved in the polyether compound, and a lower layer comprising essentially potassium hydroxide dissolved in water. Before the potassium hydroxide can be reused in the process, it must be freed from water and pulverized again, as before. It will readily be apparent, to those skilled in the art, that such a requirement renders this process substantially useless from an industrial point of view, since it is not economically feasible to recover large quantities of potassium hydroxide from solutions by known methods in an anhydrous condition and then to grind the material to a finely-divided powder suitable for reuse.

The second procedure, i. e., the synthesis of acetylenic alcohols by reacting a carbonyl compound with an organo-metallic derivative of acetylene, is not economically sound. Moreover, all of the foregoing methods for synthesizing acetylenic alcohols have the common disadvantage of being batch or discontinuous processes, and hence are more costly than if the equipment could be kept in continuous use.

I have now discovered that acetylenic alcohols can be readily and economically synthesized by a continuous procedure that is free from the above-mentioned disadvantages. In accordance with my invention, a slurry consisting of finely-divided potassium hydroxide, suspended in a suitable polyether compound such as an acetal or a diether is prepared in the following way: A mixture comprising the polyether compound and an aqueous solution of potassium hydroxide is agitated and heated in a still kettle, and as much of the water as possible removed by azeotropic distillation with the polyether compound. The two components of the distillate being immiscible, the polyether compound is decanted continuously and returned to the still, and the water is separated for use in a subsequent hydrolysis step which will be hereinafter explained. When the distillation is finished, the still-kettle contains a two-phase liquid mixture, which, if allowed to stand without agitation, separates into a lower layer consisting of potassium hydroxide, together with about 13 per cent water, and an upper layer consisting essentially of pure polyether compound. This hot mixture is then cooled with agitation, resulting in the formation of a suspension of finely-divided potassium hydroxide in polyether compound. A suitable 1-alkyne is then introduced into the potassium hydroxide-polyether compound slurry, which is maintained at a temperature ranging from about $-10°$ to $+10°$ C., and after absorption of the alkyne ceases, the desired carbonyl compound is introduced at the same temperature into the mixture. The temperature is then raised to a level ranging between the original temperature and 90° C., the optimum varying directly with the molecular weights of the alkyne and of the carbonyl compound. As a result of this operation, the potassium derivative of the corresponding acetylenic alcohol is produced. After the formation of the alcohol is complete, water is introduced in order to hydrolyze the aforesaid derivative to the parent acetylenic alcohol. This mixture of acetylenic alcohol, polyether compound, potassium hydroxide, and water is then pumped to a suitable still column, where it is fractionated under reduced pressure of the order of 500 mm., or below. In this connection, it should be pointed out that the vacuum maintained in the system at this point should be sufficiently high to reduce the boiling point of the acetylenic alcohol-water azeotrope to a value below the temperature at which said alcohol decomposes in the presence of alkali. Ordinarily, pressures of from 50 to 200 mm. will be found satisfactory in this regard. In this operation, an aqueous solution of the alcohol is obtained as the distillate, from which the pure alcohol can be secured in a substantially anhydrous state by redistillation with benzene, or some other suitable liquid that forms an azeotrope with water. After the vacuum distillation has been completed, the residue, consisting of polyether compound, potassium hydroxide, and water, is pumped to the top of a packed column, which is connected with the vessel where the two-phase mixture of potassium hydroxide and polyether compound is again produced in the manner described above.

The accompanying drawing, partly in section, is a diagrammatical representation of a particular design of apparatus that I have found convenient to employ in carrying out my continuous process, and is described with reference to the use of acetals therein. Kettle 1 containing an aqueous mixture of acetal and potassium hydroxide 2, is heated by means of circulating hot oil in jacket 3, during which time the mixture is agitated by stirrer 4, propelled by motor 5. As heating is continued, the water is removed as a constant-boiling mixture with the acetal, the vapors of said mixture rising through packed column 6 and finally entering condenser 7, from which the resultant condensate is conducted through pipe 8 into decanter 9. The condensate then stratifies into two layers, the lower layer 10 being water, and the upper layer 11, acetal. The contents of the decanter gradually increase and finally the acetal layer 11 runs over dam 12 into pipe 13, through which it is conducted back to still kettle 1 via the packed column 6. The water layer 10 in the decanter gradually rises to the top of dam 14, and then runs through pipe 15 to orifice mixer 29, where it is used in the hydrolysis of the potassium derivative of the alcohol, as hereafter described. After the dehydration has proceeded as far as possible, a two-phase liquid mixture of acetal and potassium hydroxide containing around 13 per cent water is left in kettle 1. The contents thereof are run through valve 19 into cooler 16, and agitated by stirrer 17 propelled by motor 18. This results in the formation of an acetal potassium hydroxide slurry, which is conducted by means of pump 20 into cooler 21, maintained at a temperature preferably of from −10° to 0° C. by means of circulating brine through jacket 22. The cold potassium hydroxide-acetal slurry issuing from cooler 21 then joins a stream of 1-alkyne entering through valve 23, and these reactants are intimately mixed by passing them into orifice mixer 24, maintained at a temperature of about −10° C. by circulating a suitable heat-exchange liquid, such as brine, through jacket 25. This mixture, which contains the potassium derivative of the alkyne, flows from orifice mixer 24, and en route to orifice mixer 26 is mixed with a carbonyl compound introduced through valve 27. In orifice mixer 26 (provided with jacket 28) the temperature is held within the range of about −10° to +90° C., depending on the type of alkyne and on the kind of carbonyl compound used. The potassium derivative of the acetylenic alcohol formed therein is then conducted to orifice mixer 29, where it is hydrolyzed by water fed through pipe 15. Additional water for this operation, if required, may be supplied by opening valve 30. The acetylenic alcohol thus produced, together with the acetal, potassium hydroxide, and water, flows from orifice mixer 29 through pipe 31 to still column 32, having a number of bubble-cap plates 33, horizontally disposed therein. This mixture flows in a downwardly direction through column 32, and is met by a countercurrent stream of vapors consisting of acetal and water rising from callandria 35, where they are generated, through vapor line 34 into the still column 32. Since the boiling point of the alcohol-water azeotrope is lower than that of the acetal-water azeotrope, the former is driven upwardly through column 32, through vapor line 36 and into condenser 37. The condensate, thus formed, is conducted through reflux bottle 38 down pipe 39, through which a part of said condensate is returned to column 32 in order to assist in maintaining the components of the vapor in pipe 36 free from acetal. The remainder of said condensate is permitted to flow through valve 40 to receiver 41, which is connected with vacuum line 42. Periodically, the aqueous acetylenic alcohol is withdrawn from receiver 41 by means of valve 43, and the pure alcohol is isolated in an auxiliary still by distilling the water off as an azeotrope with benzene. The mixture of potassium hydroxide, water, and acetal that collects in the bottom of callandria 35 is withdrawn at the desired rate through valve 44, and forced, by means of pump 45, through pipe 46, back to pipe 13, through which it is returned to kettle 1 via column 6, for the succeeding cycle.

As examples of acetylenic alcohols that may be prepared in accordance with my continuous process, there may be mentioned 2-methyl-3-butyne-2-ol, 3-methyl-1-pentyne-3-ol, 2-methyl-3-pentyne-2-ol, 3-methyl-4-pentyne-3-ol, 4-ethyl-1-octyne-3-ol, 6-ethyl-3-decyne-5-ol, 1-nonyne-3-ol, 1-hexyne-3-ol, 3,5-dimethyl-1-hexyne-3-ol, 3-methyl-1-nonyne-3-ol, and the like.

Examples of alkynes suitable for use in my process include, but are not limited to, acetylene, propyne, 1-pentyne, phenylacetylene, and the like.

As far as I have been able to determine, the applicability of the process of the present invention is restricted to carbonyl compounds which do not tend to undergo undesirable side reactions in the alkaline menstruum utilized. It is to be specifically understood that aliphatic ketones, as a class, are operative in the process of my invention, although I prefer to use aliphatic ketones having not in excess of eight carbon atoms so that the resulting acetylenic alcohols may be readily removed from the hydrolyzed reaction mixture by fractional distillation. The aldehydes applicable in my process are more particularly those having from four to eight carbon atoms, examples of which are butyraldehyde, hexaldehyde, heptaldehyde, 2-ethylhexaldehyde, and the like.

The ether compounds utilized in preparation of the reaction menstruum, as herein specified, may be any of several different types, examples of which are ethylene glycol diethyl ether, diethylene glycol diethyl ether, 2,3-butanediol diethyl ether, 4,5-dimethyl-2-propyl-1,3-dioxolane, 1,1-dibutoxy-2-ethylhexane, 1,1-dipropoxybutane, 1,1-dibutoxybutane, dibutoxyphenylmethane, 1,1-dibutoxyethane, 1,1-dibutoxy-2-phenylethane, dimethoxymethane, and the like.

My invention may be further illustrated by the following specific examples:

Example I

A 2-phase liquid mixture consisting essentially of 119 pounds of water, 45.5 pounds of potassium hydroxide (anhydrous basis), and 145 pounds of pure 1,1-dibutoxyethane was heated, and 104.5 pounds of water were removed therefrom by distillation in the form of the azeotrope with 1,1-dibutoxyethane. The latter was separated from the water in the distillate, and returned to the still column. As the water content of the mixture decreased, the temperature of the liquid in the kettle rose until it reached a value of about 170° C. When the dehydration had been carried as far as possible, approximately one-half mole of water remained in the still per mole of potassium hydroxide. This mixture of partially dehydrated postassium hydroxide and acetal was then conducted to a water-cooled agitator, held at a temperature of about 15°-20° C., where the potassium hydroxide crystallized out from the mixture in the form of very finely-divided particles. From the agitator this suspension of finely-divided potassium hydroxide in 1,1-dibutoxyethane was pumped to a cooler where the suspension was cooled to −10° C., after which acetylene was slowly introduced, with agitation, until no more was absorbed by said mixture at the aforesaid temperature. The quantity of absorbed acetylene amounted to 2.6 pounds. Thereafter 5.8 pounds of acetone were slowly added with agitation at −10° C. To the resultant mixture, which contained a substantial proportion of the potassium derivative of 2-methyl-3-butyne-2-ol, was then added sufficient water to hydrolyze the aforesaid derivative to 2-methyl-3-butyne-2-ol. The mixture thus obtained, consisting of potassium hydroxide, 1,1-dibutoxyethane, 2-methyl-3-butyne-2-ol, and water, was then pumped to a suitable fractionating column, where the 2-methyl-3-butyne-2-ol was separated therefrom in the form of a constant-boiling mixture with water at a pressure of 100 mm. The water in the resulting distillate was separated from the 2-methyl-3-butyne-2-ol by distilling the mixture with benzene. As a result of this operation, a quantity of pure 2-methyl-3-butyne-2-ol representing 88 per cent of the theoretical yield based on acetone was obtained. The mixture of potassium hydroxide, water, and 1,1-dibutoxyethane remaining in the still residue was pumped back to the original reaction vessel to be reused in a subsequent run.

Example II 3,5-dimethyl-1-hexyne-3-ol was prepared in essentially the same manner as described in Example I, by condensing in similar proportions isobutyl methyl ketone with acetylene at 0° to 20° C., instead of −10° C. After separation of the 3,5-dimethyl-1-hexyne-3-ol from the reaction mixture, the residue, which consisted of potassium hydroxide, water, and 1,1-dibutoxyethane, was returned to the reaction vessel for the succeeding cycle. The yield of 3,5-dimethyl-1-hexyne-3-ol amounted to 74 per cent of the theoretical amount based upon the ketone.

Example III 1-hexyne-3-ol was prepared in the same manner as described in Example I, by condensing equimolecular proportions of butyraldehyde with acetylene at −10° C. in a menstruum composed of potassium hydroxide and ethylene glycol diethyl ether. After separation of the 1-hexyne-3-ol from the reaction mixture, the residue, which consisted of potassium hydroxide, water, and ethylene glycol diethyl ether, was returned to the reaction vessel for the succeeding cycle. The yield of 1-hexyne-3-ol was 76% of the theoretical amount, based on butyraldehyde.

Example IV 3-methyl-1-pentyne-3-ol was prepared by condensing an equimolecular proportion of ethyl methyl ketone with acetylene under the conditions set out in Example I, except that the menstruum was composed of potassium hydroxide and 4,5-dimethyl-2-propyl-1,3-dioxolane. After separation of the 3-methyl-1-pentyne-3-ol from the reaction mixture, the residue, which consisted of potassium hydroxide, water, and 4,5-dimethyl-2-propyl-1,3-dioxolane, was returned to the reaction vessel for the succeeding cycle. The yield of 3-methyl-1-pentyne-3-ol, amounted to 60% of theoretical, based upon ethyl methyl ketone.

While I have illustrated my invention by certain specific applications, I do not wish to limit myself to such specific cases since, as pointed out above, any acetylenic alcohol of the general class described herein can be synthesized in accordance with my continuous process. It will be obvious to those skilled in the art that numerous modifications exist in the procedure employed for carrying out my invention. Such modifications or any equivalents thereof that would naturally occur to those skilled in the art are to be considered as lying within the scope of my invention.

My invention having now been described, what I claim is:

1. In a continuous process for the preparation of acetylenic alcohols, the steps which comprise continuously dehydrating in a still an aqueous solution of potassium hydroxide by azeotropic distillation with an ether compound which forms an azeotrope with water, which has a boiling point higher than that of the acetylenic alcohol subsequently to be formed in the process, and which is selected from the group consisting of alkyl acetals and polyethers, continuously agitating the resulting two-phase mixture of ether compound and the melted potassium hydroxide so as to form a suspension of the potassium hydroxide in the ether compound, continuously withdrawing a stream of said suspension from said still, cooling with agitation to form a suspension of finely-divided solid particles of potassium hydroxide in said ether, mixing with said stream a 1-alkyne having a terminal hydrogen atom in the 1-position, adding to the resulting mixture a carbonyl compound selected from the group consisting of aliphatic aldehydes having from four to eight carbon atoms and aliphatic ketones having not in excess of eight carbon atoms to produce the potassium derivative of the corresponding acetylenic alcohol, continuously hydrolyzing said potassium derivative with water to produce a mixture of acetylenic alcohol, ether compound, water, and potassium hydroxide, continuously removing the said alcohol therefrom in a second still under reduced pressure, continuously recycling the residual mixture of water, ether compound, and potassium hydroxide back to the first still, and distilling to remove the water therefrom in the form of its azeotrope with said ether compound while returning the volatilized ether compound to the first still, thereby continuously forming said potassium hydroxide suspension.

2. In a continuous process for the preparation of acetylenic alcohols, the steps which comprise continuously dehydrating in a still an aqueous suspension of potassium hydroxide by azeotropic distillation with an ether compound which forms an azeotrope with water, which has a boiling point higher than that of the acetylenic alcohol subsequently to be formed in the process, and which is selected from the group consisting of alkyl acetals and polyethers, continuously agitating the resulting two-phase mixture of ether compound and the melted potassium hydroxide so as to form a suspension of the potassium hydroxide in the ether compound, continuously withdrawing a stream of said suspension from said still, cooling with agitation to form a suspension of finely-divided solid particles of potassium hydroxide in said ether, mixing acetylene with said stream, adding to the resultant mixture a carbonyl compound selected from the group consisting of aliphatic aldehydes having from four to eight carbon atoms and aliphatic ketones having not in excess of eight carbon atoms to produce the potassium derivative of the corresponding acetylenic alcohol, continuously hydrolyzing said potassium derivative with water to produce a mixture of acetylenic alcohol, ether compound, water, and potassium hydroxide, continuously distilling off the said alcohol therefrom in a second still under reduced pressure, continuously recycling the residual mixture of water, ether compound, and potassium hydroxide back to the first still, and distilling to remove the water therefrom in the form of its azeotrope with said ether compound while returning the volatilized ether compound to the first still, thereby continuously forming said potassium hydroxide suspension.

3. The process of claim 2 wherein the ether compound is 1,1-dibutoxyethane.

4. The process of claim 2 wherein the carbonyl compound is acetone.

5. The process of claim 2 wherein the carbonyl compound is ethyl methyl ketone.

6. The process of claim 2 wherein the carbonyl compound is butyraldehyde.

7. In a continuous process for the preparation of acetylenic alcohols, the steps which comprise continuously dehydrating in a still an aqueous solution of potassium hydroxide by azeotropic distillation with an ether compound which forms an azeotrope with water, which has a boiling point higher than that of the acetylenic alcohol subsequently to be formed in the process, and which is selected from the group consisting of alkyl acetals and polyethers, continuously agitating the resulting two-phase mixture of ether compound and the melted potassium hydroxide so as to form a suspension of the potassium hydroxide in the ether compound, continuously withdrawing a stream of said suspension from said still, cooling with agitation to form a suspension of finely-divided solid particles of potassium hydroxide in said ether, mixing acetylene with said stream at a temperature of between about $-10°$ and $+10°$ C., adding to the resultant mixture a carbonyl compound selected from the group consisting of aliphatic aldehydes having from four to eight carbon atoms and aliphatic ketones having not in excess of eight carbon atoms, at a temperature ranging from about $-10°$ to $+90°$ C., to produce the potassium derivative of the corresponding acetylenic alcohol, continuously hydrolyzing said potassium derivative to give a mixture of acetylenic alcohol, ether compound, water, and potassium hydroxide, continuously distilling off the said alcohol therefrom at reduced pressure, recycling a stream of the residual mixture of water, ether compound, and potassium hydroxide back to the first still, and distilling to remove the water therefrom in the form of its azeotrope with said ether compound while returning the volatilized ether compound to the first still, thereby continuously forming said potassium hydroxide suspension.

EVERET F. SMITH.